United States Patent Office 3,005,848
Patented Oct. 24, 1961

3,005,848
ETHYLENEDIAMINE DERIVATIVES CONTAINING AROMATIC RINGS
Martin Knell, Yorktown Heights, N.Y., and Harry Kroll, Warwick, R.I., assignors to Geigy Chemical Corporation, a corporation of Delaware
No Drawing. Filed Sept. 9, 1957, Ser. No. 682,580
9 Claims. (Cl. 260—519)

This invention is that of ethylene bis(alpha-imino-ortho-hydroxyphenylacetic acid) and its derivatives wherein (a) at least one of the hydrogens on either or both of the ethylene carbons is replaced by (I) an alkyl group especially a lower alkyl group such as methyl or ethyl, or (II) a hydroxyalkyl group particularly a lower hydroxyalkyl group such as the ethanol group (—C$_2$H$_4$OH)

or (III) a divalent lower alkylene group, such as a lower alkylene group as the divalent tetramethylene group, —CH$_2$·CH$_2$·CH$_2$·CH$_2$—, and simultaneously linked to both of the ethylene carbons by replacing a hydrogen on each of them respectively and thereby forming with both of them a saturated six carbon ring having the two imino nitrogens still linked respectively separately to adjacent carbons, and the relative position of these nitrogens with respect to each other may be cis or trans; or (b) at least one of the four other hydrogens on at least one, and preferably both, of the benzene nuclei is replaced by a substituent group that is inert to, i.e. does not react with, a primary amine, that is to say a substituent group that is free of a functional carbonyl group such as is in the keto or aldehyde groups, for example, alkyl and especially lower alkyl, alkoxy and especially lower alkoxy, carboxyl, alkali metal or ammonium carboxylate, hydroxyl, O-alkali metal (i.e. the hydroxyl group with its hydrogen replaced by an alkali metal), sulfo, alkali cation sulfonate, nitro, amino, or a cyano group, or a halogen radical; and especially with both of the benzene nuclei being similarly substituted; or (c) both types of the substitutions (a) and (b) are present at the same time in the compound.

Certain of the substituent groups that can replace one or more of the hydrogens of the benzene nuclei may be referred to in classes, for example, the alkyl and hydroxyalkyl groups can be referred to as a substituent containing a lower alkyl group; the carboxyl and alkali cation carboxylate groups can be referred to as a substituent containing the carbonyloxy group (i.e.—C—O—)
       ‖
       O the sulfo and alkali cation sulfonate groups can be referred to as a substituent containing the group or radical —SO$_3$—; and the nitro, amino, and cyano groups can be referred to as a substituent containing nitrogen or a substituent composed of nitrogen and only one other element.

Thus, the invention includes also various types of alkali cation salts of ethylene bis(alpha-imino-ortho-hydroxyphenylacetic acid) and of any of its various above described derivatives. Among these various types of salts are those formed with either or both of the acetic acid carboxyl groups or with a carboxyl and/or sulfonic acid group on either or both of the benzene rings. These several types of salts include those with an alkali cation which is intended to include the alkali metal salts as the sodium and potassium salts, and also the ammonia-derived salts such as the ammonium salt and amine salts as those of primary, secondary and tertiary amines, for example, alkyl amines especially lower alkyl amines as methyl-, ethyl-, dimethyl- and diethylamines, as well as hydroxy- alkylamines also called alkanolamines such as the lower alkanolamines as mono-, di- or trialkanolamines illustrated by mono-, di- or triethanolamine, or diamines such as ethylenediamine, as well as heterocyclic amines as morpholine.

So also, a still further type of salt embraced by the invention is the alkali metal (e.g. sodium or potassium) phenolate type. This type, in addition to the possibility of having alkali cation carboxylate, and possibly also sulfonate, groups as described above, also has the hydrogen in at least the ortho-hydroxy group on at least one and preferably both, of the benzene nuclei replaced by an alkali metal.

In this specification and the appended claims, lower alkyl and lower hydroxyalkyl (which latter is also called lower alkanol) are those groups wherein the alkyl group has from one to six carbon atoms. The alkyl group that can replace a hydrogen on either or both of the benzene nuclei more often may not exceed ten carbon atoms.

Accordingly, the various products of the invention, including the free acids as well as their various types of above indicated salts are represented by the general formula

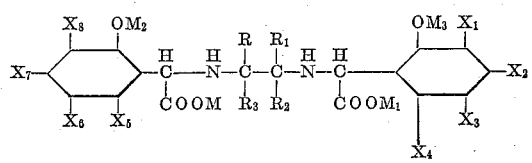

wherein R, R$_1$, R$_2$ and R$_3$ are separately selected from hydrogen, an alkyl group and especially a lower alkyl group or an alkanol group and especially a lower alkanol group, or R and R$_1$ or R$_2$ and R$_3$ respectively jointly are a divalent polyalkylene group forming a saturated ring with both of the ethylene carbons, all as described in the opening paragraph of this specification; X$_1$, X$_2$, X$_3$, X$_4$, X$_5$, X$_6$, X$_7$ and X$_8$ are independently individually selected from hydrogen and a substituent group that does not react with a primary amine, as defined in the first paragraph of this specification, and preferably with X$_1$, X$_2$, X$_3$ and X$_4$ being respectively the same as X$_8$, X$_7$, X$_6$ and X$_5$; and wherein M and M$_1$ are independently individually selected from hydrogen and an alkali cation, that is to say an alkali metal or an ammonia-derived cation of the type described above and with its nitrogen atom linked to the oxygen of the carboxyl group, as the ammonium group or the corresponding group of a primary, secondary or tertiary amine as described in the third paragraph of this specification, and generally preferably with M and M$_1$ being the same; and wherein M$_2$ and M$_3$ are independently individually selected from hydrogen and an alkali metal, and generally preferably with M$_2$ and M$_3$ being the same.

The free acid compounds of the invention, that is those wherein M, M$_1$, M$_2$ and M$_3$ in the general formula are hydrogen, are water-insoluble. However, the derivatives wherein each of M and M$_1$ is a mono-, di- or triethanolamine cation are water-soluble. So also are those wherein each of M and M$_1$ is an alkali cation, as defined in the immediately preceding paragraph, while also each of M$_2$ and M$_3$ is an alkali metal cation. Other water-soluble salts of the various derivatives are those wherein any of the substituents X$_1$ through X$_8$ is an alkali type sulfonate, i.e. an alkali metal sulfonate or a sulfonate of an ammonia-derived cation of the type described in the third paragraph of this specification.

The derivatives wherein M and M$_1$ is an alkylamine or alkanolamine cation having a higher alkyl chain, i.e. over about six carbon atoms, as in the long chain primary amines which can be straight chain amines such as laurylamine, or branched chain, are soluble in organic solvents, for example, the lower aliphatic alcohols, and show some, generally slight, solubility in hydrocarbon solvents such as solvent naphtha, benzene, toluene and hexane, and in ethyl ether and other ethers.

The compounds of the invention are prepared by condensing one mole of an ethylenediamine with two moles of the hydroxybenzaldehyde and having on the benzene nucleus the substituents desired in the end product to be made from it, and under operating conditions to eliminate two moles of water for each mole of ethylenediamine, and thereby to form the corresponding disalicylideneethylenediimine either further unsubstituted on the benzene ring or having on it the other particularly selected substituents that it was desired to have in the end product. The thus obtained particular disalicylideneethylenediimine is then treated with hydrogen cyanide to convert it to the corresponding ethylene bis(alpha-imino-ortho-hydroxyphenyl acetonitrile) which is then hydrolyzed to convert its nitrile groups to carboxyl groups.

The free acids of the invention are illustrated by but not restricted to, the following examples:

EXAMPLE 1

*Preparation of ethylene bis(alpha-imino-ortho-hydroxyphenylacetic acid) from ethylene bis(alpha-imino-ortho-hydroxyphenyl acetonitrile.*—One mole of disalicylideneethylenediimine was placed in a three-liter three-necked flask fitted with a stirrer, reflux condenser (cooled with ice water) and thermometer. A mixture of seven hundred milliliters of liquid hydrogen cyanide, one hundred and eighty milliliters of water and two and one-half milliliters of hydrochloric acid was added rapidly while stirring the reaction mixture. Stirring was continued for three hours during which in place of the initially suspended golden yellow solid there was suspended in the reaction medium a light tan solid, namely, the ethylene bis(alpha-imino-ortho-hydroxyphenyl acetonitrile). This dinitrile was then filtered off. (A sample, washed well with water and air dried, showed a melting point of 113–115° C. and neutral equivalent of 161, calculated also is 161; percent nitrogen found 17.17 calculated 17.38).

*Hydrolysis of the nitrile.*—One hundred grams (0.31 mole) of ethylene bis(alpha-imino-ortho-hydroxyphenyl-acetonitrile) were mixed with one liter of concentrated hydrochloric acid and heated with stirring at 80 to 100° C. During the first half hour of heating, most of the dinitrile had dissolved and another yellow solid began separating out. The heating was then continued to a total of three hours, after which the reaction mixture was cooled, the separated solid filtered off, washed with cold isopropyl alcohol and dried under vacuum. In this manner there was obtained 119.1 grams of mixture of the hydrochlorides of ethylene bis(alpha-imino-ortho-hydroxyphenylacetic acid), of the monoamide-monoacid, the diamide, and the diacid derived from the hydrolysis of ethylene bis(alpha-imino-ortho-hydroxyphenyl acetonitrile), and of

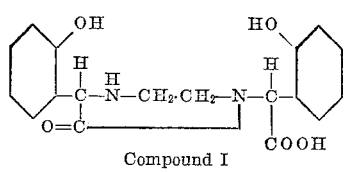

Compound I

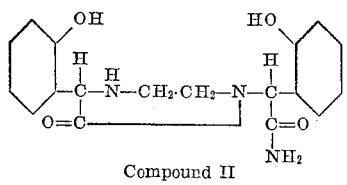

Compound II

One hundred grams of the mixture of these five hydrochlorides were dissolved in one liter of water, refluxed for four hours and then concentrated to one-half their original volume. The pH was then adjusted with sodium hydroxide from 1 to 3.5, and a pink solid separated out. This product was filtered off and, after thorough washing with water and cold isopropyl alcohol and drying under vacuum, weighed 56.9 grams, and proved to be mainly compound I above. This product was then dissolved in sufficient concentrated hydrochloric acid, and the resulting solution was heated on a steam-bath for an hour, during which the dihydrochloride of ethylene bis(alpha-imino-ortho-hydroxyphenylacetic acid) separated out. The free acid of this hydrochloride then was obtained by dissolving the hydrochride in an excess of normal sodium hydroxide, adjusting the pH to 4.0, filtering off the precipitated free acid, washing it with cold isopropyl alcohol and drying under vacuum. The overall conversion from the dinitrile to the di-acid was twenty-nine percent. Melting point 218–220° C. (with decomposition). Neutral equivalent (perchloric-acetic acid titration) found 184, calculated 180; percent nitrogen found 7.70, calculated 7.78.

EXAMPLE 2

*Tetra-methylene ethylene bis(alpha-imino-ortho-hydroxyphenylacetic acid).*—Tetra-methylene ethylenediamine was condensed with salicylaldehyde, in the ratio of one mol of the former to two moles of the latter, in known manner under conditions to eliminate two moles of water for each mole of tetra-methylene ethylenediamine. One mole of the resulting disalicylidenetetramethylene ethylenediimine (or disalicylidene 1,2-cyclohexanediamine) was placed in a three liter three-necked flask as in the preceding example. A mixture of seven hundred milliliters of liquid hydrogen cyanide containing one hundred and eighty milliliters of water and two and one-half milliliters of concentrated hydrochloric acid was added, rapidly with stirring, to convert the diimine to tetra-methylene ethylene bis(alpha-imino-ortho-hydroxyphenyl acetonitrile). The temperature was maintained at 20–25° C. for six hours. The excess hydrogen cyanide was evaporated off, and the oily dinitrile residue was carefully poured into one hundred and fifty milliliters of concentrated hydrochloric acid to hydrolyze it. After the initial exothermic reaction subsided, the mixture was warmed on a steam-bath for five hours. The resulting hot solution was filtered and the filtrate allowed to cool and its pH adjusted to 5. A tan solid separated out, which, after drying, represented a twenty-two percent yield of tetra-methylene ethylene bis(alpha-imino-ortho-hydroxyphenylacetic acid).

EXAMPLE 3

*Methylethylene bis(alpha-imino-ortho-hydroxyphenyl-acetic acid).*—Propanediamine-1,2 was condensed with salicylaldehyde, in a ratio of one mole of the former to two moles of the latter, in known manner under conditions to eliminate two moles of water for each mole of methylethylenediamine. The resulting disalicylidene-methylethylenediimine was then treated in a three-necked flask as in the preceding example with a mixture of liquid hydrogen cyanide, water and hydrochloric acid to convert it to methylethylene bis(alpha-imino-ortho-hydroxyphenyl acetonitrile). The dinitrile then was filtered off, washed well with water, and air dried. The dried dinitrile was mixed with concentrated hydrochloric acid and heated at 80 to 100° C. with stirring to hydrolyze it, as in the preceding example, to methylethylene bis (alpha-imino-ortho-hydroxyphenylacetic acid).

EXAMPLE 4

*Ethylene bis(alpha-imino-2-hydroxy - 5 - sulfophenyl-acetic acid).*—Ten grams (0.0278 mole) of ethylene bis-(alpha-imino-2-hydroxyphenylacetic acid) were added in small portions, with stirring to thirty-two and one-half grams (0.319 mole) of concentrated sulfuric acid, causing a rise in temperature to 40° C. The temperature was then raised to 90° C. and kept at 90–100° C. for one hour, during which time the solid completely dissolved. The acid solution was then cooled and poured into 800 grams of ice water. The excess sulfuric acid was then removed by the addition of the stoichiometric amount of barium hydroxide and filtering off of the precipitated barium sulfate. The clear filtrate then was concentrated to dryness by distillation under reduced pressure, yielding eleven and one-half grams of ethylene bis(alpha-imino-2-hydroxy-5-sulfophenylacetic acid) which is easily soluble in water.

EXAMPLE 5

*Ethylene bis(alpha-imino - 2 - hydroxy-5-methylphenylacetic acid).*—One hundred and thirty-six grams (1 mole) of 2-hydroxy-5-methylbenzaldehyde and two hundred milliliters of ethylenedichloride were placed in a one-liter three-necked flask equipped with a stirrer, reflux condenser, and dropping funnel. To the mixture was added thirty grams (0.5 mole) of anhydrous ethylenediamine at a rate to maintain the temperature of 30° C. After the addition was completed, the mixture was refluxed to remove by azeotropic distillation the water formed during the reaction. The reaction mixture then was cooled to 20° C. To the agitated reaction mixture there was added sixty grams of liquid hydrogen cyanide. After eight hours, a light yellow solid that had separated out was filtered off, and dried under vacuum at room temperature. Yield: one hundred and ten grams of ethylene bis(alpha-imino, 2-hydroxy-5-methylphenylacetonitrile).

This dinitrile then was added slowly to two hundred and fifty grams of concentrated hydrochloric acid (27%), and the temperature maintained below 30° C. After complete addition of the nitrile, the temperature was raised to 40° C. and maintained at this point for one hour. The reaction mixture was diluted then with an equal volume of water, and warmed at 50° C. for four hours. The reaction mixture then was cooled, and the dihydrochloride addition salt of ethylene bis(alpha-imino, 2-hydroxy-5-methylphenylacetic acid) separated out and was removed.

The free acid was obtained by suspending this dihydrochloride in water and neutralizing the suspension to pH 4 to 4.5. The solid ethylene bis(alpha-imino-2-hydroxy-5-methylphenylacetic acid) then was filtered off and dried. The thus isolated free acid agitated in water containing, dissolved therein, or to which there is added, at least two equivalents of alkali such as an alkali metal hydroxide as sodium hydroxide is converted to its alkali cation salt, particularly its carboxylate salt, such as its alkali metal, for example, sodium carboxylate. Such alkali metal carboxylate is soluble in water at pH 8.5. It is obtained in solid form following evaporating its aqueous solution to dryness.

To the aqueous solution of the just described alkali metal carboxylate, there can be added a water-soluble ferric salt, preferably in aqueous solution, such as ferric chloride, sulfate, nitrate or acetate, in proportion to give one mole of iron to three moles of the alkali metal cation, and thereby form the ferric chelate which is purple to red in color. Alternatively, the water-insoluble free acid obtained from neutralizing the dihydrochloride, as above described, is agitated in water containing in solution three moles of alkali metal hydroxide such as sodium hydroxide and one mole of the ferric salt such as ferric chloride, and thereby the ferric chelate is produced. The ferric chloride is used conveniently as the commercially available forty percent aqueous solution. On thus adjusting the pH to adequate alkalinity, the iron chelate is separated out as a dark solid, leaving sodium chloride in solution. This ferric chelate can be represented by the following formula:

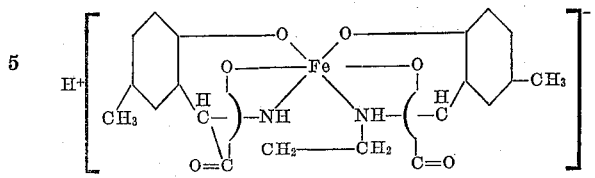

By replacing the 2-hydroxy-5-methylbenzaldehyde of Example 5 by the stoichiometric equivalent of any other (mono- or poly-)alkyl, hydroxybenzaldehyde and following the procedure of that example, there is similarly prepared with 2-hydroxy-3,5-dimethylbenzaldehyde the corresponding ethylene bis(alpha-imino, 2-hydroxy-3,5-dimethylphenylacetic acid); and replacing it with 2-hydroxy-5-ethylbenzaldehyde there is obtained ethylene bis(alpha-imino-2-hydroxy-5-ethylphenylacetic acid); and with 2-hydroxy-5-(tertiary)butylbenzaldehyde there is prepared ethylene bis(alpha-imino-2-hydroxy - 5 - tertiary-butylphenylacetic acid); and with 2-hydroxy-5-octylbenzaldehyde there is formed ethylene bis(alpha-imino-2-hydroxy-5-octylphenylacetic acid); and with 2-hydroxy-5-nonylbenzaldehyde there is formed ethylene bis(alpha-imino-2-hydroxy-5-nonylphenylacetic acid); and similarly others.

Similarly, by replacing the alkyl-2-hydroxybenzaldehyde in Example 5 by a corresponding (mono- or poly-) halo-2-hydroxybenzaldehyde, there is obtained the corresponding ethylenediamine derivative with halogen on the benzene rings, as illustrated by, but not restricted to, the following:

EXAMPLE 6

*Ethylene bis(alpha-imino - 2 - hydroxy-5-chlorophenylacetic acid).*—A solution of 156.5 grams of 2-hydroxy-5-chlorobenzaldehyde in two hundred milliliters of ethylene chloride was placed in a one liter three-necked flask equipped with stirrer, dropping funnel and Dean-Stark trap for azeotropic distillation of the water formed in the reaction. To this solution was added thirty grams of anhydrous ethylenediamine at a rate that maintained the temperature at 30° C. After the addition was complete, the mixture was refluxed to remove by azeotropic distillation the water formed. The reaction mixture then was cooled to 20° C. and sixty grams of liquid hydrogen cyanide were added with agitation. After eight hours, the light yellow solid that formed was filtered off and dried under vacuum at room temperature, yielding one hundred and twenty grams of ethylene bis(alpha-imino-2-hydroxy-5-chlorophenylacetonitrile).

One hundred grams of this foregoing dinitrile was added slowly to four hundred milliliters of concentrated hydrochloric acid, while maintaining the temperature below 30° C. After the addition was completed, the temperature was raised to 40° C. and maintained at this point for one hour. The reaction mixture then was diluted with an equal volume of water and warmed at 50° C. for four hours. After cooling, there precipitated out the dihydrochloride of ethylene bis(alpha-imino-2-hydroxy-5-chlorophenylacetic acid) which was filtered off. This dihydrochloride was converted to the free acid by suspending it in water and adjusting the pH to 4 to 4.5. The solid ethylene bis(alpha-imino-2-hydroxy-5-chlorophenylacetic acid) was filtered off and dried. A yield of sixty percent, based on the dinitrile, was obtained.

By replacing the 2-hydroxy-5-chlorobenzaldehyde of Example 6 by its stoichiometric equivalent of any other suitable 2-hydroxy-(mono- or poly-)halobenzaldehyde and following the procedure of that example, there are obtained respectively the corresponding other ethylene bis(alpha-imino-2-hydroxy-(mono- or poly-)halophenylacetic acids). For example, by replacing the Example 6 substituted benzaldehyde by 2-hydroxy-3,5-dichlorobenzaldehyde there is similarly obtained ethylene bis(alpha-imino-2-hydroxy-3,5-dichlorophenylacetic acid); with 2- hydroxy-4,5-dichlorobenzaldehyde there is prepared ethylene bis(alpha - imino-2-hydroxy-4,5-dichlorophenylacetic acid); with 2-hydroxy-5,6-dichlorobenzaldehyde there is obtained ethylene bis(alpha-imino-2-hydroxy-5,6-dichlorophenylacetic acid); then with 2-hydroxy-3,5,6-trichlorobenzaldehyde there is prepared ethylene bis(alpha-imino-2-hydroxy-3,5,6-trichlorophenylacetic acid); similarly useing 2-hydroxy-5-bromobenzaldehyde there results ethylene bis(alpha - imino - 2-hydroxy-5-bromophenylacetic acid); and with 2-hydroxy-3,5-dibromobenzaldehyde there is obtained ethylene bis(alpha-imino-2-hydroxy-3,5-dibromophenylacetic acid); then using 2-hydroxy-5-iodobenzaldehyde there results ethylene bis(alpha-imino-2-hydroxy-5-iodophenylacetic acid); and likewise with 2-hydroxy-3,5-diiodobenzaldehyde there is obtained ethylene bis(alpha-imino-2-hydroxy-3,5-diiodophenylacetic acid); and similarly others.

While the Example 6 method can yield the various halogenated derivatives of the type just described, in many cases these same various specific halogenated derivatives can be prepared much more simply by direct mono- or poly-halogenation of the benzene nuclei of ethylene bis-(alpha-imino-ortho-hydroxyphenylacetic acid) described in Example 1 hereof, and especially in the form of its tetra-alkali metal salt, by the usual methods of halogenating benzene and substituted benzenes.

Thus, for example, ethylene bis(alpha-imino-2-hydroxy-3,5-dichlorophenylacetic acid) is prepared by chlorinating an aqueous solution of the tetrasodium salt of ethylene bis(alpha-imino-2-hydroxyphenylactic acid), by the usual method for halogenating benzene and substituted benzenes that can be halogenated on the nucleus, until four molal equivalents of chlorine are absorbed. The by-product hydrogen chloride formed and dissolved in the water during the chlorination lowers the pH so that the thus obtained 3,5-dichloro derivative precipitates out and is then removed by filtration. The 3,5-dichloro derivative thus isolated is the free acid because the hydrogen chloride by-product of the chlorination converted the tetrasodium salt to the free acid form and the resulting sodium chloride remained in solution and thereby was removed still dissolved in the filtrate.

Other such halogenated derivatives are similarly prepared by like direct halogenation as also illustrated by, but not restricted to, the following:

EXAMPLE 7

*Ethylene bis(alpha-imino-2-hydroxy-3,5-dibromophenylacetic acid).*—Seventeen and eight-tenths grams of bromine were added portionwise with shaking to a solution of ten grams of ethylene bis(alpha-imino-ortho-hydroxyphenylacetic acid) in thirty-five milliliters of hydrobromic acid (48%) and one hundred and fifty milliliters of water. The bromine reacted fairly rapidly and some heat was liberated. After all of the bromine was added, a white solid began to separate out. The mixture was allowed to stand at room temperature for two hours and then cooled and filtered. The resulting isolated product, after drying under vacuum, weighed 18.9 grams and was the dihydrobromide addition salt of ethylene bis(alpha-imino-2-hydroxy-3,5-dibromophenylacetic acid). This dihydrobromide then was converted to the free acid, by suspending it in water and adjusting the pH to 4.0 to 4.5, and the liberated free acid was then filtered off and dried.

By replacing the salicylaldehyde in Examples 2 and 3 by the stoichiometrically equivalent amount of a 2-hydroxybenzaldehyde having linked to its benzene ring some other substituent group or groups inert to (i.e. that does or do not react with) a primary amine and which it is desired to have attached to the benzene ring in the end product sought, and by repeating the combination of steps of these several foregoing pertinent examples, there is obtained the corresponding ethylene bis(alpha-imino-ortho-hydroxyphenylacetic acid) derivative with the corresponding additional substituent or substituents on its benzene rings.

In the manner just indicated, with ethylenediamine; 2-hydroxy, 3-sulfobenzaldehyde yields ethylene bis(alpha-imino-ortho-hydroxy-meta-sulfophenylacetic acid); 2-hydroxy, 3-methoxybenzaldehyde yields ethylene bis(alpha-imino-ortho-hydroxy-meta-methoxyphenylacetic acid); 2-hydroxy, 3-hydroxyethylbenzaldehyde yields ethylene bis-(alpha - imino - ortho-hydroxy-meta-hydroxyethylphenylacetic acid); 2,4-dihydroxybenzaldehyde yields ethylene bis(alpha-imino-2,4-dihydroxyphenylacetic acid); 2,6-dihydroxybenzaldehyde yields ethylene bis(alpha-imino-2,6-dihydroxyphenylacetic acid); 2-hydroxy, 3-cyanobenzaldehyde yields ethylene bis(alpha-imino-ortho-hydroxy-meta-cyanophenylacetic acid); 2-hydroxy, 3-nitrobenzaldehyde yields ethylene bis(alpha-imino-ortho-hydroxy-meta-nitrophenylacetic acid); 2-hydroxy-3-aminobenzaldehyde yields ethylene bis(alpha-imino-ortho-hydroxy-meta-aminophenylacetic acid); 2-hydroxy-3-carboxybenzaldehyde yields ethylene bis(alpha - imino - ortho-hydroxy-meta-carboxyphenylacetic acid); and 2-hydroxy-5-carboxybenzaldehyde yields ethylene bis(alpha-imino-ortho-hydroxy-5-carboxyphenylacetic acid).

Similarly, by using one mole of tetra-methylene ethylenediamine, or of ethylenediamine wherein a hydrogen linked to one of the ethylene carbons is replaced by an alkyl group, e.g. methylethylenediamine, octylethylenediamine or dodecylethylenediamine, respectively separately with two moles of each of the different further substituted 2-hydroxybenzaldehydes included in the various preceding paragraphs, and following the steps of the corresponding preceding Examples 2 and 3 respectively, there are obtained respectively the corresponding individual tetra-methylene ethylene or methylethylene bis(alpha-imino-ortho-hydroxyphenylacetic acid) derivatives having respectively the corresponding additional substituents on the phenyl nucleus as specifically shown in Examples 4 through 7, and by the replacement of the particular substituted benzaldehydes used respectively in these examples by any other of the substituted benzaldehydes disclosed above as suggested replacements for any of the specific substituted benzaldehydes used in any of these examples. All of these additional specific derivatives are incorporated herein by reference as if each of them was correspondingly separately actually individually set forth in full herein.

Any 5-alkyl, or 5-alkoxy, or 5-hydroxyalkyl (such as hydroxyethyl or hydroxypropyl), 2-hydroxybenzaldehyde which may not be readily available for synthesizing a desired end product ethylene bis(alpha-imino, substituted-phenylacetic acid) readily can be prepared from the corresponding 5-alkyl or 5-alkoxy or 5-hydroxyalkyl phenol to the corresponding 2-hydroxy-5-alkyl or -alkoxy or -hydroxyalkyl benzaldehyde by the Reimer-Tieman process described at page 37 of the fourth edition of Houben-Weyl "Methoden der Organischen Chemie" (1954), Georg Thieme Verlag, Stuttgart, Germany.

Any halogenated 2-hydroxybenzaldehyde which may not be readily available for synthesizing a desired end product ethylene bis(alpha - imino, halo - substituted-phenylacetic acid) can be prepared readily from the corresponding halogenated phenol, for example, the corresponding 4-halo or 2,4-dihalophenol, by converting the such required halogenated phenol to the desired halogenated 2-hydroxybenzaldehyde by either the above-mentioned Reimer-Tieman reaction or Gatterman aldehyde synthesis as described in A. R. Surrey's "Name Reactions in Organic Chemistry."

Thus, the various 2-hydroxybenzaldehydes having some other substituents on the benzene ring, as illustrated by those in the last paragraph on page 14 above running into page 15, yield corresponding derivatives wherein three of $X_1$, $X_2$, $X_3$ and $X_4$ and three of $X_5$, $X_6$, $X_7$ and $X_8$ of the general formula in the sixth paragraph of this specification are hydrogen. Then, by reacting one mole of the ethylenediamine, or of the ethylenediamine with lower alkyl or alkanol (i.e. hydroxyalkyl) substituents on any of its ethylene carbon atoms, with two moles of an ortho-hydroxybenzaldehyde having on its benzene ring two or more other substituents of the type disclosed anywhere in this specification, there are obtained the corresponding derivatives wherein each of at least two or more of $X_1$, $X_2$, $X_3$ and $X_4$ and also $X_8$, $X_7$, $X_6$ and $X_5$ is a substituent group rather than three of each of these two groups of X's being hydrogen.

Likewise, by replacing the ethylenediamine or tetramethylene ethylenediamine or methylethylenediamine by some other differently substituted ethylenediamine, for example, where a hydrogen on each of the carbon atoms of the ethylene radical is replaced by a lower alkyl or lower alkanol (i.e. hydroxyalkyl such as hydroxy (lower) alkyl) group or a hydrogen on one of the ethylene carbons is replaced by an alkanol (i.e. hydroxyalkyl) group, and reacting one mole of such substituted ethylenediamine with two moles of any of the mono- or poly-further substituted ortho-hydroxybenzaldehydes and completing the procedures of any of the preceding applicable several examples, there result the corresponding other derivatives wherein R, $R_1$, $R_2$ and $R_3$ of the general formula are other substituents than those already described in relation to the specific examples.

While the general description, in the tenth paragraph of this specification, of the preparation of the free acids of the invention, and the illustrative examples, show the reaction first between the particular ethylenediamine and the selected salicylaldehyde and then converting the resulting diimine to its corresponding dinitrile, this order is not fixed. Thus, the selected salicylaldehyde may be reacted first with hydrogen cyanide to form the nitrile, two moles of which can then be reacted with one mole of the ethylenediamine to give the corresponding ethylene bis(alpha-imino-ortho-hydroxyphenyl acetonitrile). Then also, the hydrogen cyanide can be replaced by the equivalent quantity of an alkali metal cyanide such as sodium cyanide and the pH of the reaction mixture adjusted to provide the hydrogen cyanide equivalent.

For adjusting the pH in that step in the method as illustrated in the several examples, there can be used any suitable and compatible acid such as hydrochloric acid.

By reacting any of these free acid derivatives covered by the invention with the required equivalent amount of the corresponding alkalizing agent such as an alkali metal or ammonium hydroxide or amine of the type described in the third paragraph of this specification, there is obtained the corresponding salt wherein, for example, both M and $M_1$ of the general formula is an alkali cation of the type above defined for M and $M_1$. For example, five grams of ethylene bis(alpha-imino-ortho-hydroxyphenyl-acetic acid), briefly called "compound I," was added to ten milliliters of 6 normal ammonium hydroxide and forty milliliters of water and stirred. When all of the compound I was dissolved, the solution (pH about 9) contained the ammonium salt of compound I. Similarly, five grams of compound I was added to a solution of five milliliters of triethylamine in forty-five milliliters of water and stirred. When all of the compound I was dissolved, the solution (pH about 9.5) contained the triethylammonium salt of compound I. Any carboxyl group represented by any of $X_1$ through $X_8$ of the general formula can be converted simultaneously to the corresponding alkali cation salt by employing sufficient of the alkalizing agent.

The ethylene bis(alpha-imino-ortho-hydroxyphenyl-acetic acid) and its derivatives embraced by this invention also can be prepared, for example, by reacting together, under alkaline conditions, sodium glyoxylate and ethylenediamine (alone or alkyl-substituted as hereinabove described) and phenol (alone or substituted with any of the hereinabove disclosed substituents so long as one of the hydrogens ortho to its hydroxyl is not replaced), as seen in the following examples:

EXAMPLE 8

*Ethylene bis(alpha - imino - 2 - hydroxy - 3,5 - dimethylphenylacetic acid).*—To a solution of forty-three parts by volume of sodium glyoxylate (containing 9.8 parts of one hundred percent material) is added 3.5 parts of 86.8 percent ethylenediamine, 12.2 parts of 1,3-dimethyl-4-hydroxybenzene, and fifty parts by volume of methanol. The mixture is heated for seven hours at seventy degrees centigrade. The pH is maintained at 8.5 during the reaction, by dropwise addition of two parts of a fifty percent aqueous solution of sodium hydroxide.

After cooling the reaction to room temperature (about twenty to thirty degrees centigrade) and dilution with fifty parts by volume of water, the unreacted dimethylphenol is removed by extraction with ethyl ether. On acidifying the residual solution to pH 4.5 with dilute hydrochloric acid, there is precipitated ethylene bis(alpha-imino-2-hydroxy-3,5-dimethylphenylacetic acid) which is filtered off and washed successively with water and acetone. After drying, the yield of product is thirteen parts or 62.5 percent of theory, with neutral equivalent of 199 on electrometric titration with perchloric acid in acetic acid solution. Theoretical value is 208. The iron chelate is bluish red.

EXAMPLE 9

*Ethylene bis(alpha - imino - 2 - hydroxy - 5 - tertiary-butylphenylacetic acid).*—A solution of 52.5 parts of dichloroacetic acid and twenty-five parts by volume of water is neutralized with thirty-two parts by volume of six normal aqueous sodium hydroxide solution. To this is added seventy-five parts of p-(tertiary)butylphenol, 13.9 parts of eighty-seven percent ethylenediamine and one hundred and sixty parts by volume of methanol. The mixture is heated at eighty-five degrees centigrade for seven hours. During the reaction one hundred and ninety-five parts by volume of six normal aqueous sodium hydroxide solution is added to maintain a pH of 9.5. Methanol is removed from the reaction mixture by distillation until the vapor temperature reaches one hundred degrees centigrade.

After cooling to thirty degrees centigrade, unreacted para-(tertiary)butylphenol is removed by extraction with several portions of ethyl ether. Acidification of the aqueous phase with six normal hydrochloric acid precipitates the product, ethylene bis(alpha-imino-2-hydroxy-5-tertiary-butylphenylacetic acid). After filtering it off, washing successively with water and acetone, and drying at one hundred degrees centigrade, the yield was 63.5 parts; 67.3 percent of theory; with neutral equivalent of 213 by non-aqueous titration with perchloric acid in acetic acid solution (calculated 236).

EXAMPLE 10

*Ethylene bis(alpha - imino - 2 - hydroxy - 5 - carboxyphenylacetic acid).*—A mixture of 110.5 parts of p-hydroxybenzoic acid, fifty parts by volume of water and one hundred and five parts of dichloroacetic acid is neutralized with two hundred and sixty-eight parts by volume of 5.9 normal aqueous sodium hydroxide, with external cooling to hold the reaction mixture temperature below thirty-five degrees centigrade. Then 27.7 parts of 86.8 percent ethylenediamine are added and the temperature raised to ninety-five to one hundred degrees and maintained at that level for three and one-half hours, during which the reaction was maintained at pH 9.5 by addition of six normal aqueous sodium hydroxide solution.

The reaction solution is cooled to room temperature and acidified with six normal hydrochloric acid to pH 4. Then the resultant precipitate is filtered and washed with water and acetone, which after drying is one hundred and one parts of ethylene bis(alpha-imino-2-hydroxy-5-carboxyphenylacetic acid), with neutral equivalent of 231 by perchloric-acetic acid titration (calculated 224).

EXAMPLE 11

*Ethylene bis(alpha - imino - 2 - hydroxy - 5 - octyl-*

*phenylacetic acid*).—To a reaction vessel, equipped with a thermometer, glass and calomel electrodes, agitator and reflux condenser, are added 52.5 parts of dichloroacetic acid and twenty-five parts of water. The dichloroacetic acid is neutralized by the addition of sixty-five parts by volume of six normal aqueous sodium hydroxide solution, with external cooling to keep the temperature from exceeding fifty degrees centigrade. To this solution are added fourteen parts of eighty-six percent ethylenediamine. The temperature of the reaction mixture is raised to eighty-five degrees centigrade, and sixty-four parts of fifty percent aqueous sodium hydroxide solution are added to maintain the pH at 10, for about one hour. To the reaction mixture is added 82.5 parts of octylphenol and three hundred parts by volume of methanol. The condensation is carried out by heating for seventeen hours at seventy-five degrees centigrade.

Methanol is distilled from the reaction mixture until the internal temperature reaches eighty-five degrees centigrade, and the crude product is acidified to pH 4 by the addition of forty parts of six normal hydrochloric acid. After cooling, the supernatant liquors are decanted and the product granulated by the addition of acetone. The yield of dry product, ethylene-bis-(alpha-imino-2-hydroxy-5-octylphenylacetic acid) is 97.5 parts, with neutral equivalent of 253 (by titration with perchloric acid in acetic acid calculated value is 292). The product forms a red-purple colored iron complex.

In any of the derivatives wherein any of $X_1$ through $X_8$ is the sulfonic acid radical, addition of the alkalizing agent will convert it to the corresponding sulfonate group before any carboxyl group is changed to carboxylate. Then if carboxylates are also desired, sufficient alkalizing agent must be included to neutralize the carboxyl groups after the sulfonate groups are formed. Then to form phenolates by neutralization of the ortho hydroxyls, enough alkalizing agent must be added to make the pH greater than 10.

The derivatives of the invention, particularly as their water-soluble salts as described herein, are effective metal complexing agents in both neutral and alkaline solutions in water and also in non-aqueous solvents for the selected derivative. The resulting complexes are stable in strongly alkaline solutions, for example, ethylene bis-(alpha-imino-ortho-hydroxyphenylacetic acid) prevents the precipitation of iron in alkali concentrations from about one to about ten percent sodium hydroxide. That derivative also is an effective chelating agent for beryllium.

Derivatives of the invention are also useful as fungicides and germicides, as oxidation inhibitors in hydrocarbons, in metal deactivation and in some solvent extraction applications. To illustrate: among the amine salts of the invention are substances effective for liquid extractions. For example, some such salts after sequestering a metal from an aqueous solution, form with it a complex that is soluble in an organic solvent that may not be soluble in water. Thus, such metal can be removed from an aqueous phase to an organic phase. Manganese in water solutions, for example, will form with an amine salt of ethylene bis(alpha-imino-ortho-hydroxyphenylacetic acid) a complex that is soluble in chloroform. That enables the removal or extraction of manganese from water into an organic solvent. The presence of higher alkyl groups (i.e. seven or more carbons) on the benzene groups of a derivative of the invention enhances it solubility and that of its metal chelates in organic solvents, thereby increasing the scope of their utility.

Where seen to be applicable and compatible, suitable mixtures of any of the free acids and alkali cation salts of the invention can be used jointly in various applications of them. Metal complexes or chelates made with derivatives of the invention are soluble in aliphatic and aromatic hydrocarbons and other organic solvents, for example, lower aliphatic alcohols, ketones, lower alkyl esters of lower alkyl alcohols, and acyclic ethers as ethyl ether, or cyclic ethers such as dioxane.

The derivatives of this invention, particularly as their water-soluble salts as described herein, very readily form metal complexes with divalent and other polyvalent metals, in addition to iron (both ferrous and ferric) and manganese and beryllium already mentioned.

While the invention has been described in relation to various specific embodiments of it, many modifications and substitutions in them can be made within the scope of the appended claims which are intended also to cover equivalents of them and the many variations indicated to be possible.

This application is a continuation-in-part of our copending application Serial No. 358,558 filed May 29, 1953, now abandoned.

What is claimed is:

1. A substance having the indicated general formula

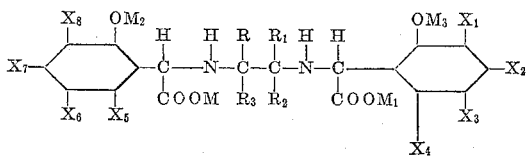

wherein any of R through $R_3$ is separately a member of the class consisting of (*a*) hydrogen, (*b*) an alkyl group having under thirteen carbon atoms, (*c*) a hydroxy(lower)alkyl group, and (*d*) part of a divalent lower polyalkylene group substituted for its respective one of only one of the pairs of (I) R and $R_1$ and of (II) $R_2$ and $R_3$; and any of $X_1$ through $X_4$ is separately a member of the class consisting of hydrogen, an alkyl group with one through ten carbon atoms, and lower alkoxy, lower hydroxyalkyl, the amino group, the carboxyl, alkali cation carboxylate, hydroxyl, alkali metaloxy, nitro, cyano, sulfo, and the alkali metal sulfonate group, and chlorine, bromine and iodine; $X_8$, $X_7$, $X_6$ and $X_5$ is correspondingly in sequence the same as $X_1$, $X_2$, $X_3$ and $X_4$ respectively; and any of M and $M_1$ is independently selected from the class consisting of hydrogen and an alkali cation; and any of $M_2$ and $M_3$ is independently selected from hydrogen and an alkali metal.

2. A free acid substance having the indicated general formula

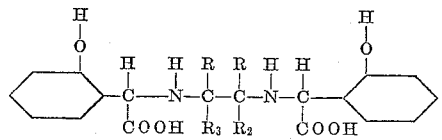

wherein any of R through $R_3$ is separately a member of the class consisting of (*a*) hydrogen, (*b*) an alkyl group having under thirteen carbon atoms, (*c*) a hydroxy(lower)alkyl group, and (*d*) part of a divalent lower polyalkylene group substituted for its respective one of only one of the pairs of (I) R and $R_1$ and of (II) $R_2$ and $R_3$.

3. A substance as claimed in claim 1, wherein each of M and $M_2$, is correspondingly in sequence the same as $M_1$ and $M_3$, respectively.

4. Ethylene bis(alpha - imino - ortho - hydroxy - alkylphenyl-acetic acid) having from one to ten carbon atoms in each alkyl group.

5. Ethylene bis(alpha - imino - ortho - hydroxyphenyl-acetic acid).

6. Ethylene bis(alpha - imino - 2 - hydroxy - 5 - methyl-phenylacetic acid).

7. A member of the class consisting of an alkali metal and the ammonium ethylene bis(alpha-imino-ortho-hydroxyphenylacetate).

8. Ethylene bis(alpha - imino - 2 - hydroxy - 5 - chlorophenylacetic acid).

9. Ethylene bis(alpha - imino - 2 - hydroxy - 5 - carboxyphenylacetic acid).

References Cited in the file of this patent

UNITED STATES PATENTS

| | | |
|---|---|---|
| 2,624,757 | Bersworth | Jan. 6, 1953 |
| 2,624,760 | Bersworth | Jan. 6, 1953 |
| 2,729,557 | Booth et al. | Jan. 3, 1956 |
| 2,824,128 | Dexter | Feb. 18, 1958 |
| 2,894,905 | Bernard | July 14, 1959 |

OTHER REFERENCES

Zahn et al.: Justus Liebigs Annalen Der Chemie, volume 579, pages 14–16 (1953).

UNITED STATES PATENT OFFICE

CERTIFICATE OF CORRECTION

Patent No. 3,005,848            October 24, 1961

Martin Knell et al.

It is hereby certified that error appears in the above numbered patent requiring correction and that the said Letters Patent should read as corrected below.

Column 1, lines 50 to 52, after the formula insert a semicolon; column 3, line 8, strike out "and"; lines 60 to 75, to the right of "Compound II", insert a period; column 4, line 15, for "hydrochride" read -- hydrochloride --; column 8, lines 68 and 69, for "page 14 above running into page 15" read -- the first paragraph of this column --; column 12, lines 47 to 52, the formula should appear as shown below instead of as in the patent:

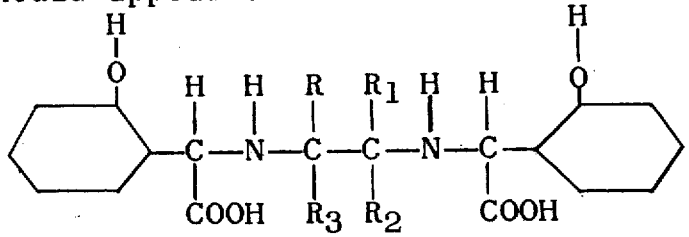

same column 12, lines 62 and 63, strike out the comma, each occurrence.

Signed and sealed this 8th day of May 1962.

(SEAL)
Attest:

ERNEST W. SWIDER
Attesting Officer

DAVID L. LADD
Commissioner of Patents